United States Patent [19]

Kramer

[11] Patent Number: 4,735,180

[45] Date of Patent: Apr. 5, 1988

[54] CENTRIFUGAL ADJUSTER FOR A FUEL INJECTION PUMP GOVERNOR

[75] Inventor: Manfred Kramer, Schwieberdingen, Fed. Rep. of Germany

[73] Assignee: Robert Bosch GmbH, Stuttgart, Fed. Rep. of Germany

[21] Appl. No.: 872,731

[22] Filed: Jun. 10, 1986

[30] Foreign Application Priority Data

Jul. 3, 1985 [DE] Fed. Rep. of Germany ....... 3523726

[51] Int. Cl.$^4$ ............................................. F02M 39/00
[52] U.S. Cl. .................................. 123/364; 123/369; 123/365; 464/3
[58] Field of Search ............... 123/364, 373, 365, 366, 123/368, 370, 371, 372, 373; 74/572; 192/105 C; 73/526; 464/3

[56] References Cited

U.S. PATENT DOCUMENTS

| Re. 23,889 | 10/1954 | Seaver | 123/364 |
|---|---|---|---|
| 2,009,934 | 7/1935 | Mallory | 464/3 |
| 2,058,095 | 11/1977 | Habu | 464/3 |
| 3,146,770 | 9/1964 | Garcea | 123/369 |
| 3,865,091 | 2/1975 | Bastick | 123/366 |
| 4,263,881 | 4/1981 | Isobe | 123/364 |
| 4,289,101 | 9/1981 | Knorreck | 123/372 |
| 4,353,340 | 10/1982 | Straubel | 123/369 |
| 4,362,139 | 12/1982 | Isobe | 123/364 |
| 4,426,970 | 1/1984 | Galis | 123/365 |

FOREIGN PATENT DOCUMENTS

| 1104758 | 4/1961 | Fed. Rep. of Germany | 123/365 |
|---|---|---|---|
| 2113571 | 12/1972 | Fed. Rep. of Germany | 123/364 |
| 214249 | 4/1941 | Switzerland | 123/364 |

Primary Examiner—Carl Stuart Miller
Attorney, Agent, or Firm—Edwin E. Greigg

[57] ABSTRACT

A centrifugal adjuster for a fuel injection pump governor having a driving part driven at an rpm in synchronism with the engine and having a torsionally elastically coupled flyweight holder guided in a rotational guide. Via a step, beyond a predetermined rotational deflection, the centrifugal adjuster displaces the flyweight holder axially with respect to the driving part, so that a jolt-like stroke effected by means of the step is superimposed on the regulating stroke effected via the flyweights of the centrifugal adjuster whenever the rpm is at a low level, for instance at idling rpm. As a result, a friction that leads to see-sawing of the engine and exhibits pronounced hysteresis is shaken out of the governor.

23 Claims, 3 Drawing Sheets

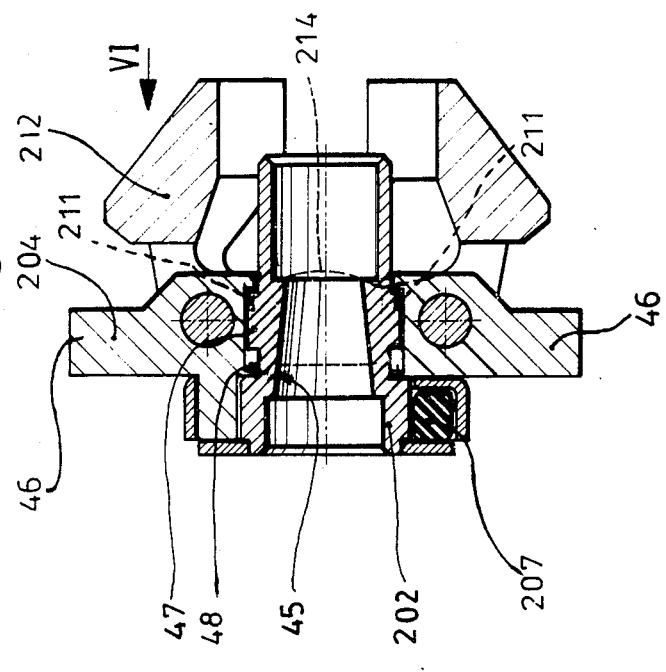
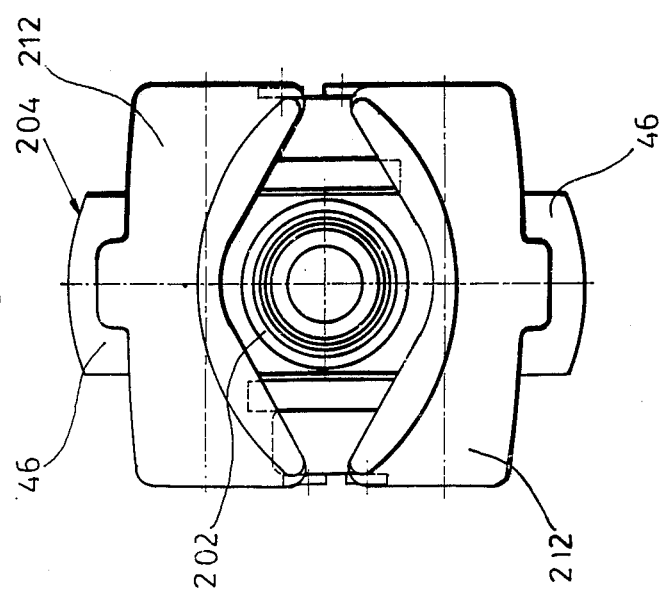

CENTRIFUGAL ADJUSTER FOR A FUEL INJECTION PUMP GOVERNOR

BACKGROUND OF THE INVENTION

The invention is based on a centrifugal adjuster as generally defined hereinafter. By means of the centrifugal adjuster, the speed governor of the fuel injection pump is supplied with the engine rpm as an actual value in the form of a regulating travel; on this basis, along with an evaluation of the load, which is also to be supplied to the governor, the injection quantity and thus the set-point rpm are regulated. In this kind of centrifugal adjuster, the flyweights, as they rotate are engaged by rpm-dependent centrifugal force, which is transmitted to an adjusting sleeve via bell cranks joined to the flyweights; the sleeve is engaged by a spring that acts counter to this force, so that the regulating travel of the sleeve corresponds to the centrifugal force. The prestressing of the spring engaging the sleeve can be varied by the governor as a function of load, so that the regulating travel of the sleeve then corresponds to both load and rpm.

This speed governor connected to the centrifugal adjuster has a governor rod, on the lever of which various bearing positions are provided; there are also bearing positions of one lever on the shaft of another lever. The cooperation among the levers, some of which have variable operative lengths, becomes quite complicated, and the bearing positions are subject to a variably severe amount of friction. This friction transmitted to the governor causes hysteresis in governing, which has a disadvantageous effect on engine operation. A Coulomb friction of this kind produces low-frequency rpm fluctuations, on the order of approximately 2 Hz, during engine idling. This governor error, which causes engine "seesawing", has a particularly pronounced effect during idling, because in that state only small fuel quantities are metered, and so slight differences in quantity, whether in terms of fuel metering or fuel consumption, have a very marked effect, and further it is well known that deviations of 30% from the set-point quantity can arise in the quantity metered to or consumable by each engine cylinder. In dynamic terms, these differences have a correspondingly extremely brief influence on engine speed and hence, via the speed governor, on the injection quantity. Depending on which engine cylinder the variation in injection quantity may be applicable to, this can cause an undesired increase or slowing down of the mean rpm that is to be established by governing. The result may be that at desired idling speeds of 600 rpm, the deviation may be more than 200 rpm, which causes the above-mentioned unsteady engine operation known as "seesawing".

As is well known, a Diesel engine has a considerable degree of rotational irregularity or imbalance or non-concentricity, which is due to various factors, and it can be only partly compensated for by providing a flywheel. This non-concentricity of the engine produces vibrations in the range between 20 and 40 Hz, depending on the mean rpm and the number of cylinders. While it is still possible to control rpm fluctuations, resulting from the degree of non-concentricity, by providing specific means of damping them or by maintaining them in part and transmitting them to the governor accordingly, such control is no longer attainable for the seesawing vibrations, which are additionally superimposed on the others. The only product of the seesawing frequencies is noise, that is, interference, and so it becomes desirable to eliminate them to the greatest possible extent.

The drive shaft of the centrifugal adjuster, which in the case of an in-line injection pump for instance is the camshaft, is driven directly by the engine, so that the degree of non-concentricity is transmitted directly to the driving part of this centrifugal adjuster. In a centrifugal adjuster of the above generic type, a torsionally elastic coupling is therefore provided between the driving part and the flyweight holder, and depending on whether the acceleration of a given rpm is positive or negative this has the effect that the flyweight holder is in advance of or trails behind the rotational movement of the driving part, so that because of the torsionally elastic connection, a positive or negative rotational angle relative to a mean position is attained.

In a known centrifugal adjuster of this generic type (Swiss Pat. No. 21 42 49), rubber-elastic elements serve as the torsionally elastic coupling, each of them supported on one side on the driving part and on the other on the flyweight holder. By means of this kind of torsionally elastic coupling, the positive and negative rotational angle relative to the flyweight holder, superimposed on the rotational movement because of the degree of non-concentricity of the engine, is damped; the disadvantage of this is that because of hysteresis the rpm governor develops greater friction, particularly in idling, and thus becomes more sluggish and less accurate; the effect of this is an increase in the seesawing fluctuation during engine idling.

Another known centrifugal adjuster (German Pat. No. 21 13 571) has as its elastic coupling a friction coupling, which exhibits increasing friction as the angle of rotation increases and has a spiral spring for adjusting the initial rotational position of the two parts relative to one another; this spring engages the driving part on the one hand and the flyweight body on the other. With this elastic coupling, severe damping of the transmission of the degree of non-concentricity in the rotation is once again attained, which is intended to prevent torsional vibration on the part of the injection pump governor, which could interfere with the governor characteristic. The disadvantage, however, is that this also increases the hysteresis of the rpm governor during idling, which still has a large number of bearing locations and masses; the effect, in particular, is an increase in seesawing vibrations.

OBJECT AND SUMMARY OF THE INVENTION

The centrifugal adjuster according to the invention for a fuel injection pump governor has the advantage over prior art that the degree of non-concentricity of the engine is utilized to obtain not only a certain damping but also a sufficient relative rotation between the driving part and the flyweight holder, which being converted into reciprocating movements act upon the rpm governor so as to lessen its hysteresis. (Thus the torsionally elastically coupled flyweight holder, like the driving part, executes torsional vibrations, which however extend relative to the camshaft movement or the movement of the driving part.) These angular deflections in the relative rotation, which are due to the degree of non-concentricity of the engine, are at a maximum at idling rpm and then decrease with increasing rpm. The angular deflections are somewhat less at low load as well. In that case, these torsional vibrations extending relative to the camshaft movement are converted into short axial movemtens of the reciprocating member of the rpm governor, which member is driven by the flyweights, and these stroke vibrations, or reciprocating vibrations, are transmitted to the governor rod. As soon as the rotational guidance step according to the invention is reached, that is, during the course of the relative rotation between the driving part and the flyweight holder, an additional, abrupt shift takes place in the axial direction of the flyweight holder; this shfit is superimposed on the above-mentioned stroke adjustment. This additional stroke movement has a jolting effect and causes jolting vibrations at the governor rod, so that to a large extent the mechanical friction can be "shaken out". Since the initial amplitude (angular deflection) becomes less with increasing rpm, the differential vibration angle also decreases; as a result, above a certain rpm the step in the rotational guidance is no longer reached, and thus from this rpm level on, the jolting effect automatically ceases. Advantageously, a jolter is thus put into play in the idling range by the invention, which in the overall regulating loop acts like a series-connected vibration damper, and beyond a certain rpm or beyond a cetain load increase as well is automatically switched off again because of the then-decreasing amplitude of torsional vibration. The inherent frequency of this torsion vibrator, embodied by the centrifugal adjuster, can be determined by the appropriate selection and embodiment of the elastic coupling between the driving part and the flyweight holder, as well as by the type of rotational guidance and step used. This inherent frequency can be adapted to the frequency of the governor, and interfering vibrations can largely be compensated for.

According to an advantageous embodiment of the invention, the step is embodied as a protrusion, which is disposed on the driving part or flyweight holder and cooperates with an indentation disposed on the other relatively rotating part and defined by two transition points. The protrusion may be disposed on the slide block, or the slide block may itself serve as the protrusion, which is guided in a slot one end face of which, facing the slide block in an axial direction, has the indentation. Either the end of the camshaft or a sleeve that can be fastened to this end may serve as the driving part. The adaptation of the torsionally elastic coupling member, such as a spring, and of the length of the possible rotational travel and the location at which the step is disposed is advantageously selected to be such that this rotational travel is not fully utilized during operation, yet on the other hand in the event of breakage of the spring, there are adequate emergency operation properties, which is accomplished by a rotational coupling of the flyweight holder with the driving part. With this design, it is advantageous that the higher, less harmful and more easily controlled vibrations in the degree of non-concentricity of the engine can be used in a very simple manner to reduce governor hysteresis; during idling, when the protrusion meets the limitations of the indentation in both vibration directions of the vibrator according to the invention, low-frequency rpm fluctuations can be reduced, and the Coulomb friction, for which this rpm range of the governor is critical, can be shaken out in this range.

According to an advantageous embodiment of the invention, the torsionally elastic coupling may be embodied either as a spring or as a rubber-elastic buffer, that is, an elastic force transmitter which engages the driving part on the one hand and the flyweight holder on the other. Advantageously, the elastic coupling need merely to be capable of torsional vibration and to give the flyweight holder the opportunity of executing a relative travel, with respect to the driving part, in the axial direction as well, corresponding to the height of the step.

The invention will be better understood and further objects and advantages thereof will become more apparent from the ensuing detailed description of preferred embodiments taken in conjunction with the drawings.

BRIEF DESCRIPTION OF THE DRAWINGS

FIG. 5 is a detailed longitudinal cross section taken through a third exemplary embodiment; and FIG. 6 is a view of the third exemplary embodiment in the direction of the arrow VI in FIG. 5.

DESCRIPTION OF THE PREFERRED EMBODIMENTS

Figure 1:
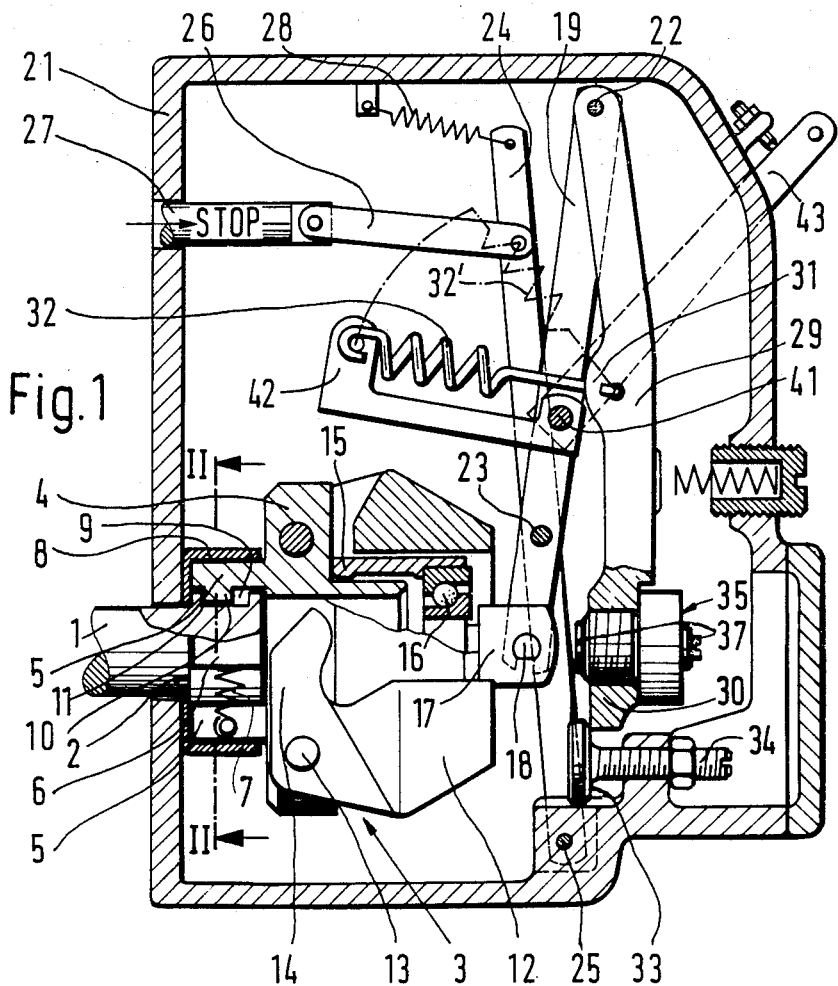
FIG. 1 shows a longitudinal cross section taken through a centrifugal rpm governor having a centrifugal adjuster according to the invention, as a first exemplary embodiment.
Figure 2:
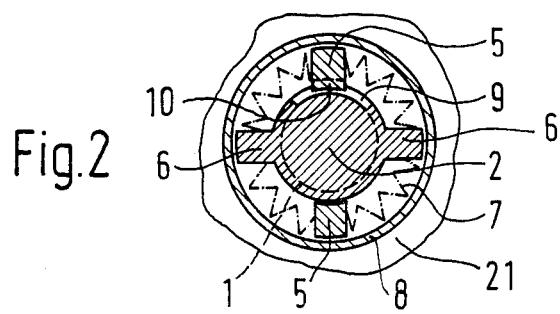
FIG. 2 is a section taken along the line II—II of FIG. 1.

In the centrifugal governor shown in FIG. 1, belonging to a fuel injection pump which is not itself shown, a driving part 2 of a centrifugal adjuster 3, selected as the first exemplary embodiment, is secured on the camshaft 1 of the pump. For the sake of simplicity, the driving part 2 here is shown integral with the end of the camshaft 1, merely having a larger diameter than the camshaft 1. A flyweight holder 4 is supported in a radially guided manner on the driving part 2, such as to allow a certain relative rotation as well as a certain axial movement, or stroke, between the driving part 2 and the centrifugal adjuster 3. As shown by FIG. 2 taken together with FIG. 1, jaws 5 are disposed on the flyweight holder 4 and engage the driving part 2, which radially guides them. Ribs 6 are located on the driving part 2 parallel to the jaws 5 in an axial direction. Between the ribs 6 and the jaws 5, elastic force transmitting means 7 are provided, which are shown here in the form of helical springs but could equally well be made of rubber and embodied as rubber springs. By means of the jaws 5, the ribs 6 and the elastic means 7, an elastic torsion coupling is formed between the driving part 2 and the flyweight holder 4. A cage 8 which surrounds the elastic coupling 5, 6, 7 prevents radially outward deflection of the elastic force transmitting means 7. These elastic means 7 seek to keep the driving part 2 and the flyweight holder 4 in a middle rotational position relative to one another, but they yield whenever sufficiently great rotational acceleration forces in one or the other rotational direction originate in the driving part 2. As shown by way of example in the other two exemplary embodiments described below, other suitable devices can naturally also be used as the elastic coupling.

In the jacket face of the driving part 2, there is also a longitudinal recess 9, extending crosswise to the axis of rotation and serving as a slot; this slot is engaged by a slide block 10, which is disposed on one of the jaws 5 of the flyweight holder 4. The length of the longitudinal recess 9 is selected such that upon relative movements of the driving part 2 with respect to the flyweight holder 4, the slide block 10, because of the force of the elastic means 7, does not strike the radial end of the longitudinal recess 9 located on the long side. Thus in the rotational direction, the slide block 10 vibrates freely in the slot 9. In the axial direction, in contrast, the slide block 10 is guided in the longitudinal recess 9, so that rotational guidance between the driving part 2 and the flyweight holder 4 is provided. This rotational guidance has a step 11, by means of which, beyond a certain relative rotation between the driving part 2 and the flyweight holder 4, that is, beyond a certain vibration amplitude between the parts, the flyweight holder 4 is briefly shifted axially relative to the driving part 2, so that a sort of jolting effect is produced, which is then transmitted by the centrifugal adjuster 3 onto the speed governor. Naturally this step 11, or incline, can be embodied in various ways; the criterion is that beyond a predetermined amplitude of torsional vibration, this step 11 comes into action and that in addition to the torsional vibration, an axial vibration component having a jolting effect is produced. In this manner, the relatively high-frequency (up to 40 Hz) torsional vibration that exists because of the degree of non-concentricity of the engine is partially damped by the elastic force transmitting means, so that this torsional vibration is transmitted to the speed governor only to a reduced extent and hence is no longer disruptive, and furthermore, beyond a predetermined vibration amplitude is converted into stroke impacts, which turn the centrifugal adjuster 3 into a jolter.

Figure 3:
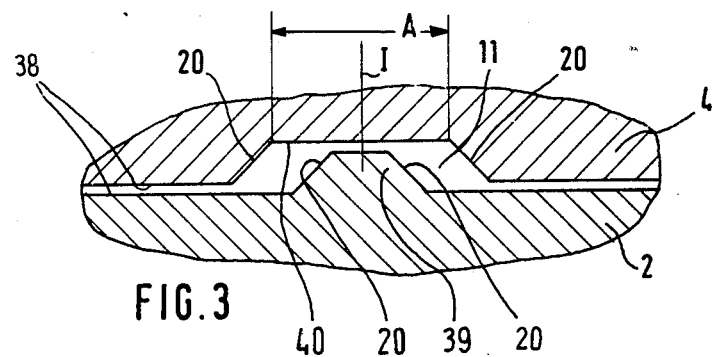
FIG. 3 is a schematic illustration of the step according to the invention.

In FIG. 3, for the sake of better comprehension, such a step 11 is shown schematically. On the end faces 38 of the driving part 2 and flyweight holder 4 that face each other and are pressed together by the governor spring that engages the flyweight holder 4, a protrusion 39 is provided on one end face and an indentation 40 is provided on the other end face. Oblique inclines 20 are provided in the direction of rotation on both the protrusion 39 and the indentation 40. The symbol I indicates the axis of vibration, which extends exactly in the middle between the inclines 20. Now if the driving part starts to rotate, being driven by the camshaft, then torsional vibrations both in and opposite the rotational direction, originating in the degree of non-concentricity of the engine, are superimposed on this rotational movement of the driving part. These torsional vibrations accordingly oscillate about the axis of vibration I. Because of the elasticity of the elastic coupling between the driving part 2 and the flyweight holder 4, the inclines 20 of the protrusion draw closer to and pull away from the inclines 20 of the indentation 40 with a frequency that corresponds to the frequency of the torsional vibrations. The elastic coupling acts as a vibration damper. The amplitude of these torsional vibrations is dependent on rpm, among other functions, and the amplitude becomes smaller with increasing rpm. In FIG. 3, the amplitude A is shown in the form of the deflection of the vibrations about the axis of vibration I. The distance between the inclines 20, and the spring characteristic of the elastic force transmitting means, are selected such that at idling rpm, at which the amplitude A is relatively large, opposing inclines 20 abut one another and cause the flyweight holder 4 to be moved away from the driving part 2 in the direction of the axis of vibration I. Then as soon as the rpm rises further, or the load increases, the amplitude of these torsional vibrations lessens, as is well known, so that the inclines 20 no longer come into contact with one another and the axial adjustment correspondingly does not take place. This axial adjustment causes what has here been called "jolting", so that the centrifugal adjuster according to the invention can also be called a jolter. This jolter is thus effective at low rpm, and in particular at idling rpm, and it automatically becomes ineffective whenever the rpm or the load increases. As shown in FIG. 1, flyweights 12 are pivotably supported on bearing bolts 13 on the flyweight holder 4. With arms 14 disposed at right angles to them, these flyweights 12 engage a governor sleeve 15 serving as a governor member, which transmits the sleeve stroke effected by the flyweights 12 to a sleeve bolt 17, via a thrust bearing 16. By means of bearing journals 18, the sleeve bolt 17 is the fulcrum for a speed governor guide lever 19, which is pivotable at one end on a bearing pin 22 secured in the governor housing 21 and thus guides the governor sleeve 15 in its reciprocating movements. A pin 23 secured on the guide lever 19 serves as a pivot bearing for a two-armed intermediate lever 23, one end of which is pivotably supported integral with the housing on a bearing pin 25 and the other end of which is the fulcrum, via a connection bar 26, for the governor rod 27 which acts as the injection quantity adjusting member of the injection pump; an arrow marked "STOP" is provided on the governor rod 27, indicating the direction in decreasing injection quantity.

The end of the intermediate lever 24 is engaged by a play-compensating spring 28, which is suspended in the governor housing 21 and also serves as a starting spring.

Besides the guide lever 19, a single-armed force lever 29 acting as a force transmitting member is also pivotably supported on the bearing pin 22. This force lever 29 is held in the position shown by the tensile force of a governor spring 32 which engages the vicinity of a hanger eye 31, and in this position the force lever is pressed with its outermost end 30 against a head 33 of a stop screw 34 that serves as a full-load stop.

At the level of the sleeve bolt 17, an adjustment device 35 is screwed into the force lever 29. Thus, with its stop bolt 37, urged by an adaptation spring, not shown, this device 35 cooperates with the sleeve bolt 17 and the governor sleeve 15 to provide control. The governor spring 32 is biased into the position shown, which is for the maximum rpm to be regulated, via a pivot lever 42 that is pivotably supported on a journal 41 in the governor housing 21. As shown, the biasing is effected by means of an operating lever 43 secured to the journal 41 and located outside the governor housing 21. The pivoted position of the governor spring 32 for regulating an idling rpm is shown in the drawing in dot-dash lines.

The mechanical speed governor shown functions as follows:

For starting, the operating lever 43 is pivoted into the position shown, which corresponds to a maximal injection quantity, with the governor spring 32 being biased accordingly. The governor spring pulls the force lever 29 with its end 30 against the head 33 of the full-load stop screw 34. The governor rod 27 is in the position of repose of the flyweighs 12, effected by the biasing force of the starting spring 28, in the position that controls the starting quantity. Once starting has taken place, and under the force of the flyweights 12 as they deflect outward, the governor sleeve 15 shifts to the right from the position shown, and displaces the sleeve bolt 17 counter to the force of the starting spring 28 until it contacts the stop bolt 37. In this process, the governor rod 27 is retracted in a known manner to its set full-load position for low rpm. The governor rod 27 remains in this position until the stop bolt 37 begins to deflect, in accordance with the biasing force of the adjustment spring, and thus initiates the proper control movement. Once the adjustment control stroke has ended, the governor rod 27 remains in the full-load position until such time as it is displaced in the STOP direction, as a consequence of the speed initiated by the centrifugal adjuster as a function of the breakaway speed defined by the governor spring 32.

A speed governor of this kind, because of its many bearing locations and lever transmissions, has relatively high internal friction, which is particularly disadvantageous at low rpm, such as at idling speed, because it causes pronounced hysteresis. By the jolting effect at low rpm of the centrifugal adjuster 3 according to the invention, this internal friction is shaken out to the extent required. The primary advantage attained thereby is that the low-frequency vibrations that cause seesawing of the engine are suppressed.

Figure 4:
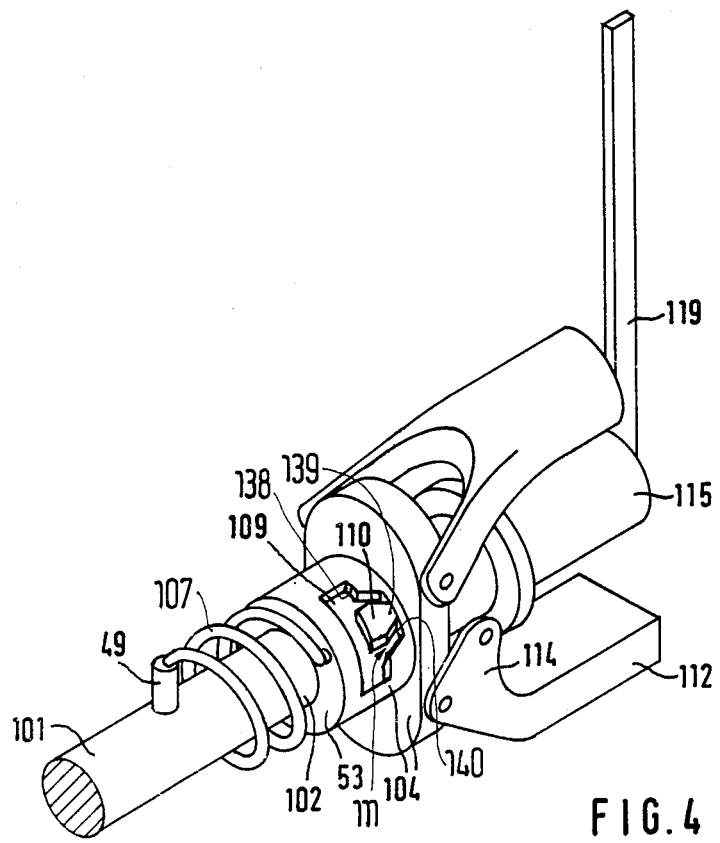
FIG. 4 is a perspective view of a second exemplary embodiment.

In FIG. 4, the secondary exemplary embodiment of a centrifugal adjuster in shown in a perspective view. Here again, for the sake of simplicity, the end of the camshaft 101 is shown as the driving part 102, supported rotatably on the flyweight holder 104. The flyweights 112 of the flyweight holder act with their arms 114 upon the governor sleeve 115, which in turn, with its ends remote from the centrifugal adjuster 3 act upon the guide lever 119. Between the driving part 102 and the flyweight holder 104, a helical spring 107 arranged coaxially with respect to the driving part 102 is provided; a tang 49 joined in a rotationally fixed manner with the camshaft 101 is joined to one end of this helical spring 107, while the other end of the spring 107 engages an end face 53 of the flyweight holder 104. A sliding block 110 is radially disposed on the driving part 102 and penetrates a longitudinal recess 109, serving as a slot, in the flyweight holder 104. The indentation 140, on the end face 138 of this longitudinal recess 109 facing the flyweights 112, and the protrusion 139, on the sliding block 110, are provided as the step 111 and thereby effect the jolting movement.

During operation, the flyweight holder 104 vibrates with am amplitude corresponding to the frequency about the driving part 102 or camshaft 101, and during these vibrations the helical spring 107, which acts as a torsion spring, is slightly opened and then compressed again during each vibration. Beyond a predetermined amplitude, the sliding block 110 then strikes the step 111, so that the entire flyweight holder 104, including the flyweights 112 and the governor sleeve 115, undergoes a slight displacement in the axial direction of the centrifugal governor; this happens upon each vibration, because the sliding block 110 slides down again from the step upon each vibration. Otherwise, this second exemplary embodiment functions like the first one.

In principle, the third exemplary embodiment, shown in FIGS. 5 and 6, also functions like the embodiments described above. Here the driving part 202 is sleeve-like and is fastened in a simple, conventional manner with its conical inner bore 45 positioned upon the correspondingly embodied end of the camshaft. Rubber-elastic buffers 207, such as those known as dampers for centrifugal adjusters, serve here as the elastic force transmitting means of this drive coupling between the driving part 202 and the flyweight holder 204. The flyweights 212 function in the same manner as described above, and their arms 214, bent inward at right angles, act upon the governor sleeve, not shown here. As also shown in FIG. 5, the flyweights 212 have a maximum mass in the least possible space, and flange-like ends 46 provided on the flyweight holder 204 serve as a maximal stop for the flyweights 212. Serving as the rotational guide between the driving part 202 and the flyweight holder 204 are protrusions 47 arranged centrally symmetrically on the jacket face of the driving part 202, which engage corresponding grooves 48, serving as a slot, in the inner bore of the flyweight holder 204. Here again, a step 211, not shown in detail here, is provided for producing the jolting effect; similar to what is shown schematically in FIG. 3, this step may again have two inclines facing one another.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A centrifugal adjuster of a fuel injection pump governor, having a driving part driven at an rpm in synchronism with the engine, a flyweight holder, means for torsionally elastically coupling said flyweight holder with said driving part, and having a limitation of an elastic rotational angle between the driving part and the flyweight holder, and further having flyweights supported on the flyweight holder and engaging a governor sleeve, a guide having a step provided between the driving part and the flyweight holder so that beyond a predetermined relative rotation between the driving part and the flyweight holder an axial stroke movement of said flyweight holder relative to said driving part is permitted by the step, this axial stroke movement being superimposed on an axial stroke of said governor sleeve dictated by said flyweights on said flyweight holder.

2. A centrifugal adjuster as defined by claim 1, in which said predetermined relative rotation is generated by torsional vibrations due to a drive rpm, which is at the idling and low partial load lever.

3. A centrifugal adjuster as defined by claim 1, in which said step is disposed on the driving part and on the flyweight holder and has a transitional zone.

4. A centrifugal adjuster as defined by claim 2, in which said step is disposed on the driving part and on the flyweight holder and has a transitional zone.

5. A centrifugal adjuster as defined by claim 1, in which said step is embodied as a protrusion disposed on said driving part which protrusion cooperates with an indentation defined by two transitional locations disposed on a corresponding relatively rotatable part.

6. A centrifugal adjuster as defined by claim 2, in which said step is embodied as a protrusion disposed on said driving part which protrusion cooperates with an indentation defined by two transitional locations disposed on a corresponding relatively rotatable part.

7. A centrifugal adjuster as defined by claim 3, in which said step is embodied as a protrusion disposed on said driving part which protrusion cooperates with an indentation defined by two transitional locations disposed on a corresponding relatively rotatable part.

8. A centrifugal adjuster as defined by claim 1, in which at least one spring acts as a torsionally elastic coupling, which at one end engages said driving part and at its other end engages said flyweight holder.

9. A centrifugal adjuster as defined by claim 2, in which at least one spring acts as a torsionally elastic coupling, which at one end engages said driving part and at its other end engages said flyweight holder.

10. A centrifugal adjuster as defined by claim 3, in which at least one spring acts as a torsionally elastic coupling, which at one end engages said driving part and at its other end engages said flyweight holder.

11. A centrifugal adjuster as defined by claim 4, in which said at least one spring acts as a torsionally elastic coupling, which at one end engages said driving part and at its other end engages said flyweight holder.

12. A centrifugal adjuster as defined by claim 5, in which at least one spring acts as a torsionally elastic coupling, which at one end engages said driving part and at its other end engages said flyweight holder.

13. A centrifugal adjuster as defined by claim 8, in which said at least one spring engages said driving part and the flyweight holder in both rotational directions, so that a system vibrating about a middle position is created, and that the spring force increases as the rotational angle increases.

14. A centrifugal adjuster as defined by claim 8, in which at least one spring is a helical torsion spring disposed coaxially with said driving part and with its ends engaging said driving part and said flyweight holder.

15. A centrifugal adjuster as defined by claim 13, in which said at least one spring is a helical spring disposed coaxially with said driving part and with its ends engaging said driving part and said flyweight holder.

16. A centrifugal adjuster as defined by claim 8, in which at least two springs are provided, having opposite operational directions.

17. A centrifugal adjuster as defined by claim 13, in which at least two springs are provided, having opposite operational directions.

18. A centrifugal adjuster as defined by claim 16, in which four springs are provided, each with one end engaging a driver element of said flyweight holder and with its other end engaging a driver element of said driving part.

19. A centrifugal adjuster as defined by claim 1, in which rubber-elastic buffers are used as elastic force transmitting means, which are supported on the one hand on said driving part and on the other hand on said flyweight holder.

20. A centrifugal adjuster as defined by claim 2, in which rubber-elastic buffers are used as elastic force transmitting means, which are supported on the one hand on said driving part and on the other hand on said flyweight holder.

21. A centrifugal adjuster as defined in claim 3, in which rubber-elastic buffers are used as elastic force transmitting means, which are supported on the one hand on said driving part and on the other hand on said flyweight holder.

22. A centrifugal adjuster as defined by claim 4, in which rubber-elastic buffers are used as elastic force transmitting means, which are supported on the one hand on said driving part and on the other hand on said flyweight holder.

23. A centrifugal adjuster as defined by claim 5, in which rubber-elastic buffers are used as elastic force transmitting means, which are supported on the one hand on said driving part and on the other hand on said flyweight holder.

* * * * *